United States Patent
Chang et al.

(10) Patent No.: US 7,492,060 B2
(45) Date of Patent: Feb. 17, 2009

(54) FAULT-TOLERANT CIRCUIT DEVICE IN FUEL CELL AC INVERTER

(75) Inventors: Yung-Ruei Chang, Taoyuan (TW);
Yuan-Hsiang Ho, Taoyuan (TW);
Chen-Min Chan, Taoyuan (TW)

(73) Assignee: Atomic Energy Council - Institute of Nuclear Energy Research, Taoyuan (TW)

( * ) Notice: Subject to any disclaimer, the term of this patent is extended or adjusted under 35 U.S.C. 154(b) by 325 days.

(21) Appl. No.: 11/514,344

(22) Filed: Sep. 1, 2006

(65) Prior Publication Data

US 2008/0054726 A1    Mar. 6, 2008

(51) Int. Cl.
*H02J 1/00*    (2006.01)

(52) U.S. Cl. .................................................... 307/82
(58) Field of Classification Search ................. 307/82
See application file for complete search history.

(56) References Cited

U.S. PATENT DOCUMENTS

2006/0256912 A1* 11/2006 Katayama et al. .......... 376/277

* cited by examiner

*Primary Examiner*—Robert L. Deberadinis
(74) *Attorney, Agent, or Firm*—Troxell Law Office, PLLC

(57) ABSTRACT

A fault-tolerant device is kept functioning in an alternating-current inverter for fuel cell even if an inverter unit in the device is malfunctioned. The malfunctioned inverter unit is rep laced with a backup inverter unit to keep the device functioning.

7 Claims, 4 Drawing Sheets

FAULT-TOLERANT CIRCUIT DEVICE IN FUEL CELL AC INVERTER

FIELD OF THE INVENTION

The present invention relates to a fault-tolerant device; more particularly, relates to keeping a fuel cell AC (alternating current) inverter functioning even when an inverter unit in the fuel cell AC inverter is malfunctioned.

DESCRIPTION OF THE RELATED ART

A prior art as shown in FIG. 4, is a patent of U.S. RE37,126 E "Multilevel cascade voltage source inverter with separate DC sources". The prior art has a plurality of inverter circuits 41 having a series connection; and each inverter circuit 41 comprises a plurality of switch diodes 411 and a capacitor 42. And the prior art can be used as a step-up and commutation circuit for a fuel cell (not shown in the figure) for compensating reactive power and voltage balancing.

Although the above prior art is capable of compensating reactive power and voltage balancing, the inverter circuits 41 are in a series connection; and so, when any one of the switch diodes 411 or the capacitors 42 is malfunctioned, the whole inverter circuit 41 is malfunctioned as well, which in turn makes the fuel cell malfunctioned or even broken. This surely results in somewhat a sum of cost in applying such an expansive fuel cell. Hence, the prior art does not fulfill users requests on actual use.

SUMMARY OF THE INVENTION

The main purpose of the present invention is to replace an inverter unit in a fuel cell AC inverter with a backup inverter unit when the inverter unit is malfunctioned; and, by doing so, a whole fuel cell AC inverter keeps functioning regardless of the malfunctioned inverter unit.

To achieve the above purpose, the present invention is a fault-tolerant circuit device in a fuel cell AC inverter, comprising a plurality of inverter units each comprising a capacitor and a plurality of switch diodes and having a series connection; a dispatching and time-series control system connecting to the inverter units and a plurality of fuel cells; a plurality of backup inverter units connecting to the dispatching and time-series control system and having a series connection with the inverter units and each comprising a capacitor and a plurality of switch diodes; a control unit connecting to the dispatching and time-series control system; a detection unit connecting to the inverter units, the backup inverter units and the control unit; and a switch unit connecting to the inverter units, the backup inverter units and the control unit. Accordingly a novel fault-tolerant circuit device in a fuel cell AC inverter is obtained.

BRIEF DESCRIPTIONS OF THE DRAWINGS

The present invention will be better understood from the following detailed description of the preferred embodiment according to the present invention, taken in conjunction with the accompanying drawings, in which FIG. 1 is the view showing the structure of the preferred embodiment according to the present invention;

DESCRIPTION OF THE PREFERRED EMBODIMENT

The following description of the preferred embodiment is provided to understand the features and the structures of the present invention.

Figure 1:
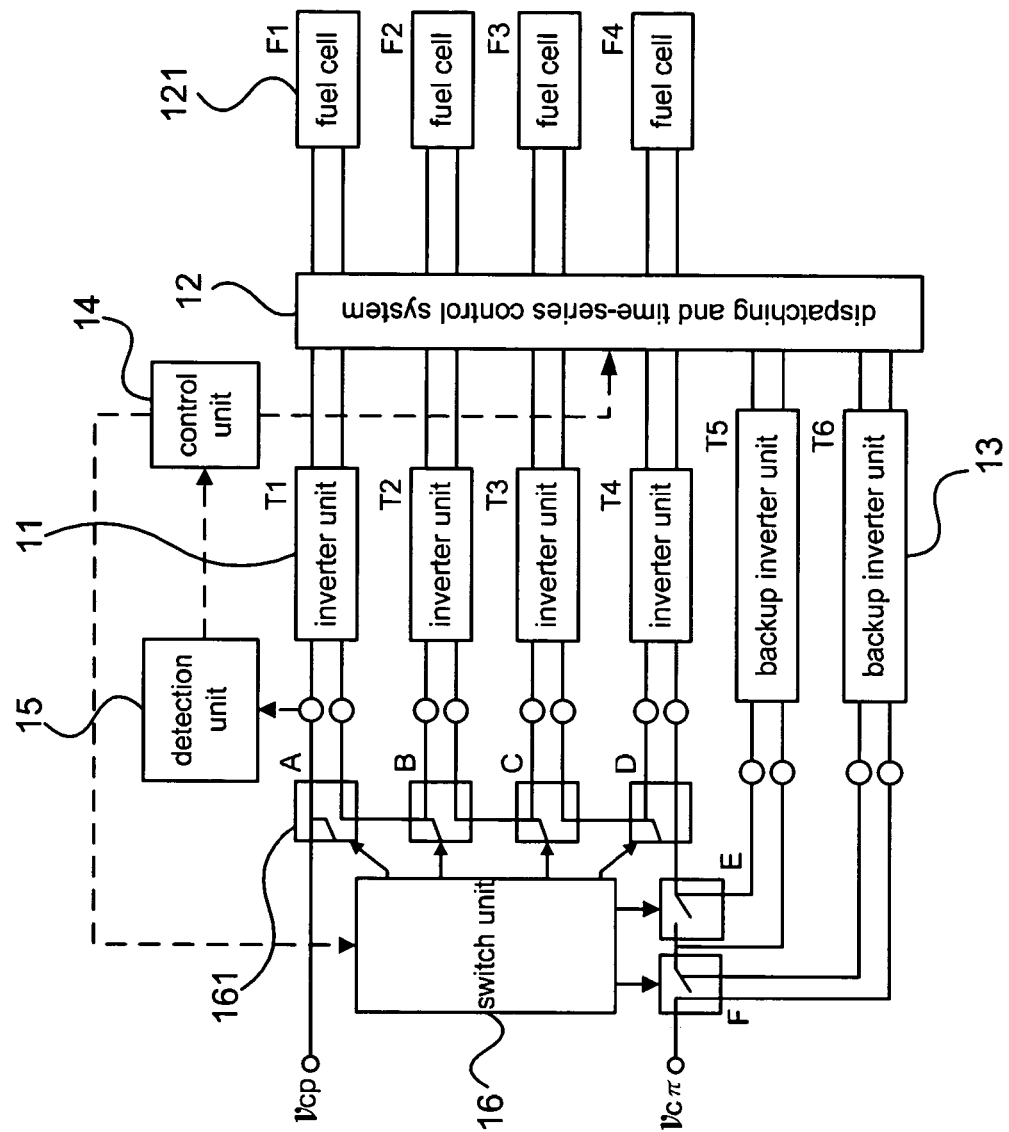

Please refer to FIG. 1, which is a view showing a structure of a preferred embodiment according to the present invention. As shown in the figure, the present invention is a fault-tolerant circuit device in a fuel cell AC (alternating current) inverter, comprising a plurality of inverter units 11, a dispatching and time-series control system 12, a plurality of backup inverter units 13, a control unit 14, a detection unit 15 and a switch unit 16.

Each inverter unit 11 has a capacitor and a plurality of switch diodes.

The dispatching and time-series control system 12 is connected with each inverter unit 11; and the dispatching and time-series control system 12 is connected with a plurality of fuel cells 121.

Each backup inverter unit 13 comprises a capacitor and a plurality of switch diodes and is connected with the dispatching and time-series control system 12; the backup inverter units 13 have a series connection in themselves; and the backup inverter units 13 have a series connect ion with the inverter units 11.

The control unit 14 is connected with the dispatching and time-series control system 12.

The detection unit 15 is connected with the inverter units 11, the backup inverter units 13 and the control unit 14.

The switch unit 16 is connected with the inverter unit 11, the backup inverter units 13 and the control unit; and the switch unit 6 has a plurality of switch components 161 each separately located between the switch unit 6 and one of the inverter units 11 as well as between the switch unit 6 and one of the backup inverter units 13.

Thus a novel fault-tolerant circuit device in a fuel cell AC inverter is obtained.

Figure 2:
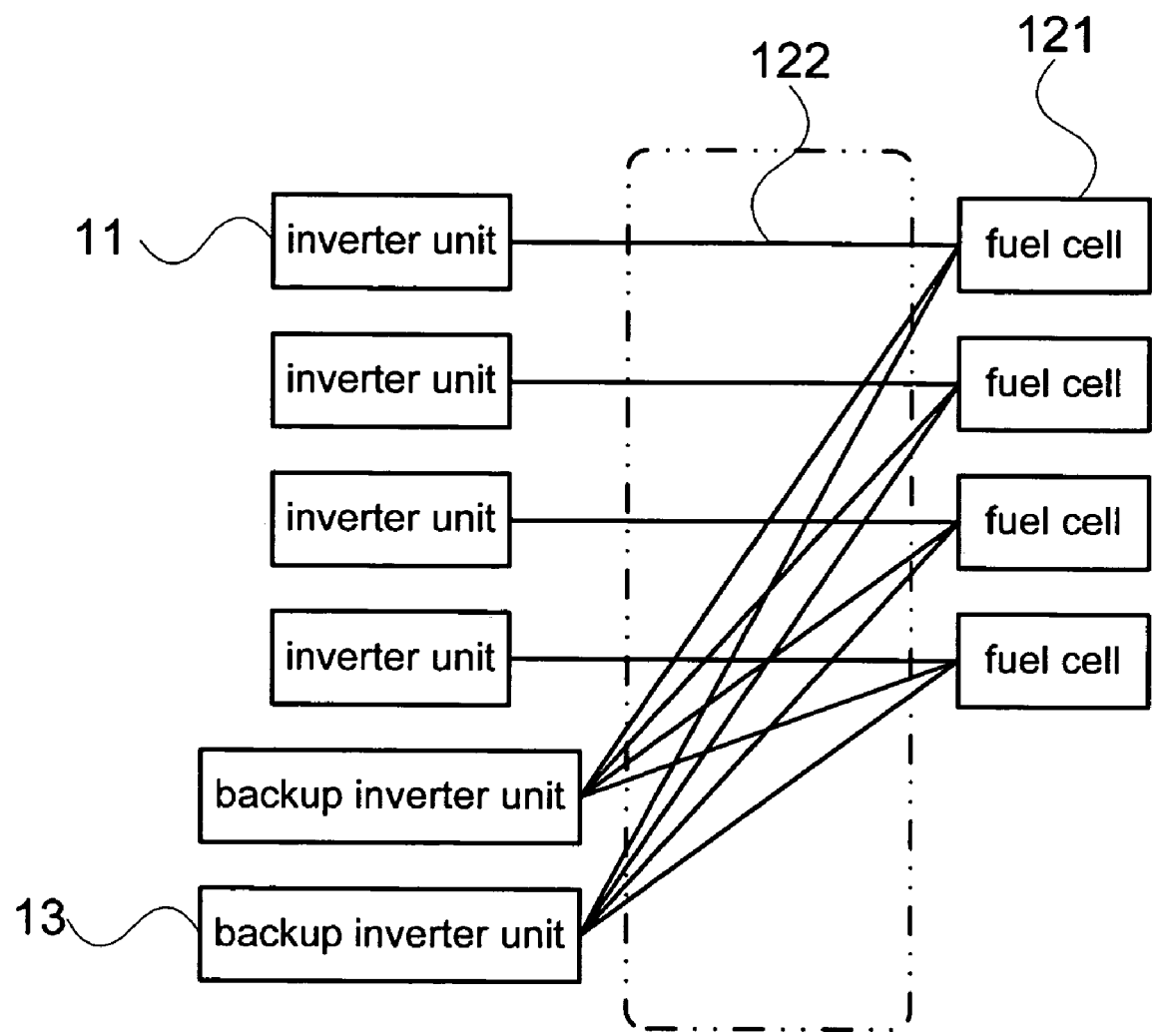
FIG. 2 is the view showing the connections in the dispatching and time-series control system.

Please refer to FIG. 2, which is a view showing connections in a dispatching and time-series control system. As shown in the figure, inverter units 11, backup inverter units 13, and fuel cells 121 are connected through circuits 122. In a normal operation, each fuel cell 121 is connected with a corresponding inverter unit 11. When anyone of the inverter units 11 is malfunctioned, its output waveform does not conform with a default waveform. The corresponding fuel cell 121 changes its connection to a backup inverter unit 13; and a full bridge time-series of the malfunctioned inverter unit 11 is applied to the backup inverter unit 13 as a replacement.

Figure 3:
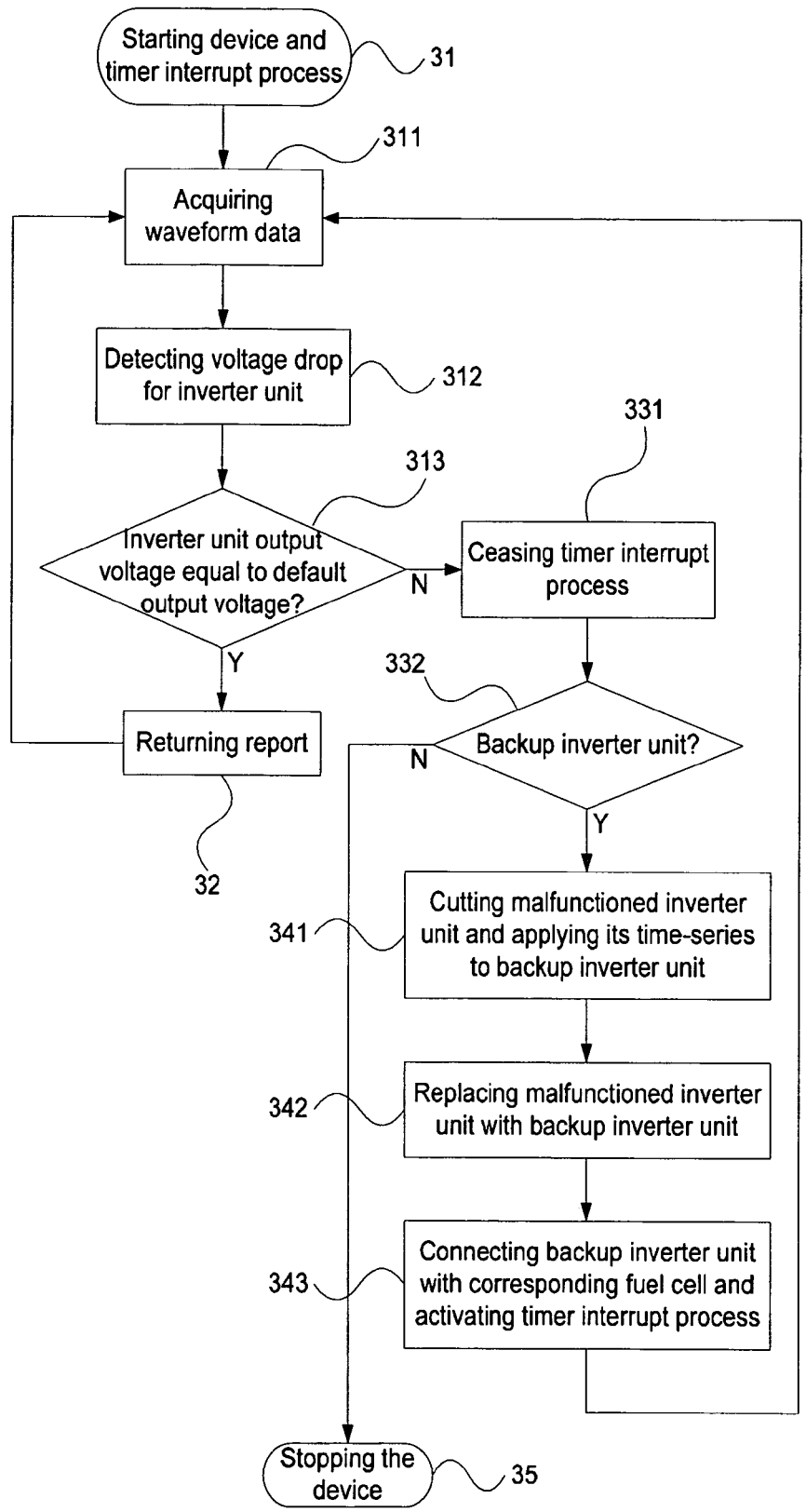
FIG. 3 is the view showing the operating process.
Figure 4:
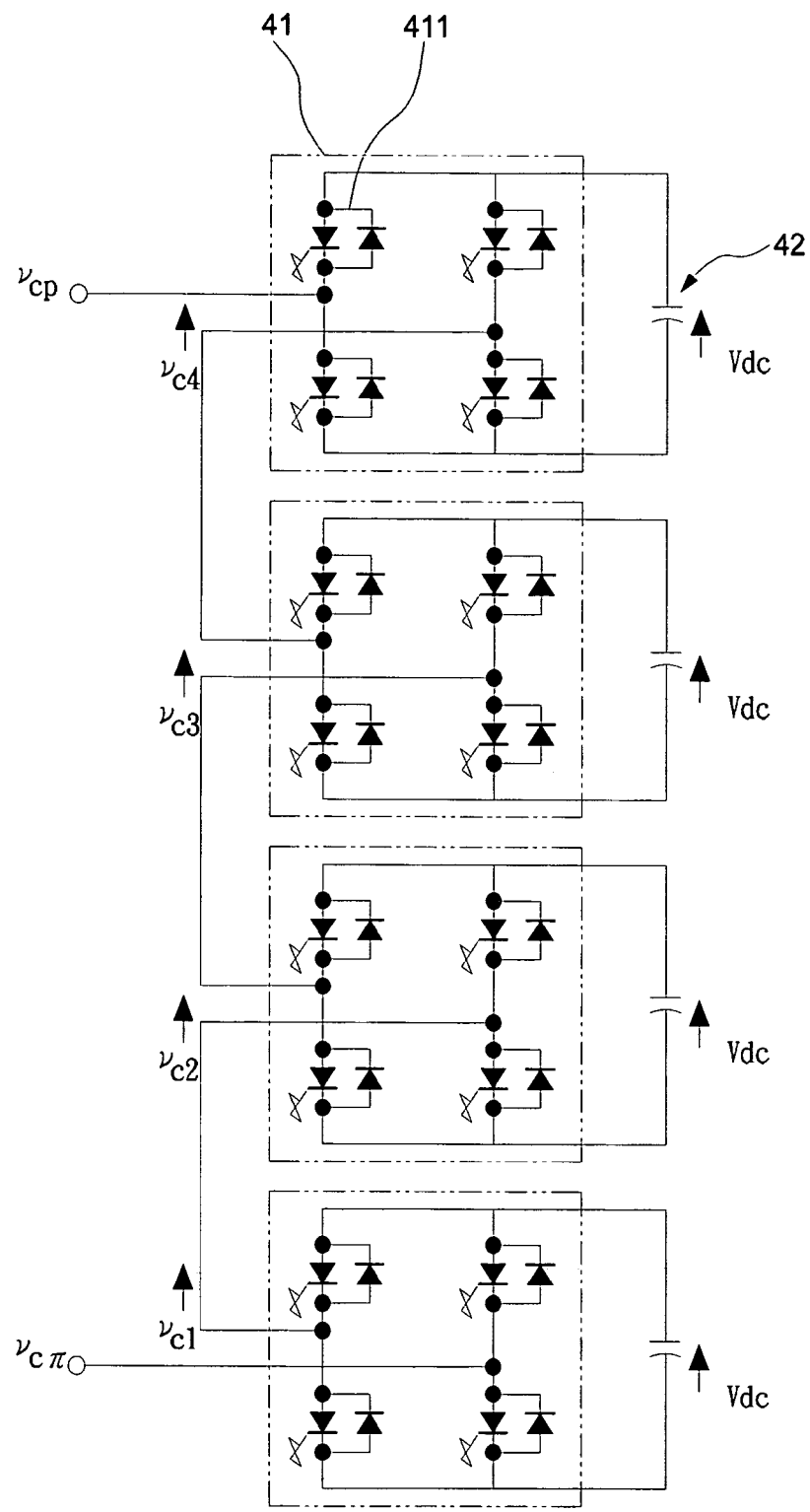
FIG. 4 is the view of the circuit of the prior art.

Please refer to FIG. 3, which is a view showing an operating process. As shown in the figure a fault-tolerant circuit device in a fuel cell AC inverter according to the present invention has an operating process, comprising the following steps:

(a) Starting a device and activating a timer interrupt process 31: A fault-tolerant circuit device in a fuel cell AC inverter according to the present invention is started and a timer interrupt process is activated as well.

(b) Acquiring waveform data 311; Waveform data are acquired by a detection unit 15.

(c) Detecting voltage drop for each inverter unit 312: After a rating time of the timer interrupt process, a voltage drop for each inverter unit 11 is separately obtained through the detection unit 15.

(d) Comparing output voltage of the inverter unit with a default output voltage 313: A comparison between the output voltage of each inverter unit 11 and a default output voltage is done. When the output voltage of the inverter unit 11 is equal to the default output voltage, step (e) 32 is then processed. When the output voltage of the inverter unit 11 is not equal to the default output voltage, step (f1) 331 is then processed.

Hence, when the output voltage of the inverter unit 11 is equal to the default output voltage, the operating process continues with the following step:

(e) After returning report, looping back to step (b) 32: A report is returned to the control unit 14 and then step (b) 311 is processed.

In the other hand, when the output voltage of the inverter unit 11 detected in step (d) 313 is not equal to the default output voltage, the operating process continues with the following steps:

(f1) Ceasing the timer interrupt process 311: the timer interrupt process is ceased.

(f2) Searching for backup inverter unit in the device 332: A backup inverter unit 13 is searched for. When the backup inverter unit 13 is found, step (g1) 341 is then processed. When the backup inverter unit 13 is not found, step (h) 35 is then processed.

When the backup inverter unit 13 is found, the operating process continues with the following steps:

(g1) Cutting a connecting circuit of a malfunctioned inverter unit and applying the malfunctioned inverter unit's time-series to a backup inverter unit 341: A malfunctioned inverter unit is found by the dispatching and time-series control system according to a mismatching waveform; a connecting circuit between the malfunctioned inverter unit and a corresponding fuel cell is cut; and a time-series of the malfunctioned inverter unit is applied to a backup inverter unit 13.

(g2) Replacing the malfunctioned inverter unit with the backup inverter unit 342: The malfunctioned inverter unit 11 is replaced with the backup inverter unit 13 by an open circuit between the backup inverter unit 13 and a switch component 161 of a switch unit 16 as well as a short circuit between the malfunctioned inverter unit 13 and the switch component 161 of the switch unit 16.

In the beginning, when the switch unit 16 successfully activates the inverter units 11, the connection between any one of the inverter units 11 and the switch component 161 of the switch unit 16 is in an open circuit state; and the connection between any one of the backup inverter unit 13 and the switch component 161 of the switch unit 16 is in a short circuit state. Yet, when the inverter unit 11 is malfunctioned, the connection between the malfunctioned inverter unit 11 and the switch component 161 of the switch unit 16 is turned to a short circuit state; the connection between the backup inverter unit 13 and the switch component 161 of the switch unit 16 is turned to an open circuit state; and, by doing so, the malfunctioned inverter unit 11 is replaced with the backup inverter unit 13.

(g3) Connecting the backup inverter unit with the corresponding fuel cell, activating the timer interrupt process and processing step (b) 343: A new connecting circuit between the backup inverter unit 13 and the corresponding fuel cell 121 is built; the timer interrupt process is activated again; and then step (b) 311 is processed.

However, when the backup inverter unit 13 is not found, the operating process continues with the following step:

(h) Stopping the device 35: The whole device is stopped.

Consequently, with the above steps, an operation process for the present invention is obtained, where the inverter unit 11 and the backup inverter unit 13 is a three-phase and wye-connected circuit or a three-phase and delta-connected circuit.

To sum up, the present invention is a fault-tolerant circuit device in a fuel cell AC inverter where a backup inverter unit replaces a malfunctioned inverter unit in a fuel cell so that a fuel cell AC inverter keeps functioning even when an inverter unit in the fault-tolerant circuit device is malfunctioned.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A fault-tolerant circuit device in a fuel cell AC inverter, comprising:
    a plurality of inverter units, said inverter unit comprising a capacitor and a plurality of switch diodes, said inverter units having a series connection;
    a dispatching and time-series control system, said dispatching and time-series control system being connected with said inverter units, said dispatching and time-series control system being connected with a plurality of fuel cells;
    a plurality of backup inverter units, said backup inverter unit comprising a capacitor and a plurality of switch diodes, said backup inverter units having a series connection, said backup inverter units having a series connection with said inverter units, said backup inverter units being connected with said dispatching and time-series control system;
    a control unit, said control unit being connected with said dispatching and time-series control system;
    a detection unit, said detection unit being connected with said inverter units, said backup inverter units and said control unit; and
    a switch unit, said switch unit being connected with said inverter units, said backup inverter units and said control unit.

2. The device according to claim 1,
    wherein one of said inverter units is functioned with an open circuit between said inverter unit and said switch unit and with a short circuit between one of said backup inverter units and said switch unit.

3. The device according to claim 1,
    wherein one of said inverter units is malfunctioned with an open circuit between said inverter unit and said switch unit and with a short circuit between said backup inverter unit and said switch unit.

4. The device according to claim 1,
    wherein said switch unit has a plurality of switch components and said switch component is separately located between said switch unit and one of said inverter units as well as between said switch unit and one of said backup inverter units.

5. The device according to claim 1,
    wherein said inverter unit is a three-phase and wye-connected circuit.

6. The device according to claim 1,
    wherein said inverter unit is a three-phase and delta-connected circuit.

7. The device according to claim 1,
    wherein said device has an operating process, comprising steps of:
    (a) starting said device and activating a timer interrupt process;

(b) obtaining waveform data by said detection unit;
(c) after a rating time, separately obtaining a voltage drop for each of said inverter units through said detection unit;
(d) comparing an output voltage of said inverter unit with a default output voltage; when said output voltage of said inverter unit is equal to said default output voltage, going to step (e); when said output voltage of said inverter unit is not equal to said default output voltage, going to step (f1);
(e) returning a report to said control unit and going to step (b);
(f1) ceasing said timer interrupt process;
(f2) searching for backup inverter unit in said device; when said backup inverter unit is found, going to step (g1) when said backup inverter unit is not found, going to step (h);
(g1) finding a malfunctioned inverter unit by said dispatching and time-series control system according to a mismatching waveform, cutting a connecting circuit between said malfunctioned inverter unit and a corresponding fuel cell and applying a time series of said malfunctioned inverter unit to a backup inverter unit;
(g2) obtaining a short circuit between said malfunctioned inverter unit and a switch component of said switch unit and an open circuit between said backup inverter unit and said switch component of said switch unit;
(g3) building a new connecting circuit between said backup inverter unit and said corresponding fuel cell, activating said timer interrupt process and going to step (b); and
(h) stopping said device.

* * * * *